United States Patent [19]

Kuhl

[11] Patent Number: 4,724,854

[45] Date of Patent: Feb. 16, 1988

[54] APPARATUS FOR PRE-WASHING AND ACCUMULATING EGGS

[76] Inventor: Henry Y. Kuhl, Kuhl Rd., P.O. Box 26, Flemington, N.J. 08822

[21] Appl. No.: 848,619

[22] Filed: Apr. 7, 1986

[51] Int. Cl.$^4$ .............................................. B08B 1/02
[52] U.S. Cl. .................................. 134/68; 134/72; 134/134; 134/105; 198/445; 198/442
[58] Field of Search ............... 198/445, 436, 442, 456, 198/597; 15/3.13; 134/62, 67, 68, 72, 127, 131, 105

[56] References Cited

U.S. PATENT DOCUMENTS

| | | | |
|---|---|---|---|
| 2,666,711 | 1/1954 | Crosset | 15/3.13 X |
| 3,193,078 | 7/1965 | Amenta et al. | 198/442 X |
| 3,252,607 | 5/1966 | Rose et al. | 15/3.13 X |
| 3,311,216 | 3/1967 | Jones . | |
| 3,349,419 | 10/1967 | Kuhl et al. . | |
| 3,360,817 | 1/1968 | Halverson | 15/3.13 |
| 3,428,161 | 2/1969 | Niederer | 198/445 |
| 3,447,176 | 6/1969 | Butterworth et al. | 15/3.13 X |
| 3,716,127 | 2/1973 | Loeffler . | |
| 3,759,368 | 9/1973 | Rose et al. | 198/445 X |
| 3,792,768 | 2/1974 | Cheeseman | 198/445 |
| 4,179,022 | 12/1979 | Grocke et al. | 198/442 X |
| 4,276,977 | 7/1981 | van Kattenbroek | 198/445 X |
| 4,353,455 | 10/1982 | Mumma et al. . | |
| 4,358,341 | 11/1982 | Berquist . | |

Primary Examiner—Timothy F. Simone
Assistant Examiner—Frankie L. Stinson
Attorney, Agent, or Firm—Sperry, Zoda & Kane

[57] ABSTRACT

An apparatus is disclosed for pre-washing and accumulating eggs which includes within a pre-wash station a pre-wash housing as well as spray conduits and spray jets for receiving pressurized cleaning fluid from a pump for spraying upon eggs traveling upon a conveyor located therebelow. A holding tank receives the spent fluid for recirculation through the pump. An egg diverting mechanism is included to prevent the grouping of eggs upon one lateral location upon the conveyor. The diverting mechanism includes rods extending laterally across the conveyor and one or more vertically extending plates positioned immediately above the conveyor to divert or guide the eggs into a somewhat more random orientation upon the egg conveyor when they reach the diverting mechanism in a group or bunched configuration. An accumulator is included to divide the randomly positioned eggs into rows upon the conveyor. This accumulator includes a number of vertically extending channel members extending vertically with respect to the conveyor and immediately thereabove to guide the eggs into rows upon the conveyor. A lateral moving mechanism is included for moving of the channel members in cyclical fashion laterally with respect to the conveyor to facilitate guiding of the eggs into the rows defined by the channels between the channel members. A main washing station is positioned immediately downstream from the accumulator. The inclusion of a pre-wash station pre-wets the eggs prior to passage adjacent to the diverting mechanism and the accumulator thereby facilitating guiding of the eggs into rows since the eggs are wet as they contact the channeling vertically extending members. Also, residue or debris on the eggs is softened by the cleaning solution wetting the eggs prior to passing to the actual main washing station.

26 Claims, 3 Drawing Figures

APPARATUS FOR PRE-WASHING AND ACCUMULATING EGGS

BACKGROUND OF THE INVENTION

1. Field of the Invention

The present invention deals with the field of devices for processing eggs prior to main washing thereof. By careful control of the treatment of eggs prior to washing, the washing step itself can be greatly enhanced. That is, a pre-washing step which allows the debris to be softened by constant contact with cleaning solution as well as the use of a diverting means for guiding the eggs to a somewhat random orientation across the conveyor when used in combination with an accumulator of one of the particular configurations shown in the present invention greatly enhances the utility of the main washing step. Also, the inclusion of an inspection station upstream of the washing station is greatly enhanced by the heating of cleaning solution which is applied at the pre-washing station since this heating more clearly displays imperfections such as cracks in the eggs allowing for an inspection step usually performed manually where a user will remove eggs.

2. Description of the Prior Art

Prior art devices for the treatment of eggs prior to the main washing step are normally limited to some type of configuration for orienting the eggs upon rows on the conveyor means. The present invention provides a novel specific configuration for this orientation as well as a combination of a pre-washing step and a diverting means which greatly enhances the utility of the accumulator means. Also, an inspection step is included in the processing of the eggs in accordance with the present invention prior to the main washing and a double conveyor configuration wherein the conveyors that are moving at different speeds is particularly usable for preventing egg jams.

SUMMARY OF THE INVENTION

An apparatus for pre-washing and accumulating eggs is enclosed which includes a conveying means designed to carry a plurality of eggs thereon which are initially randomly positioned. A pre-washing station is positioned in the upstream area of the conveying means and extends thereacross to define a pre-washing chamber therein. The pre-washing housing also defines a spray outlet in the general bottom area thereof for allowing the directing of cleaning solution onto both the conveying means and any eggs traveling thereon. A spray conduit is included extending through the pre-washing chamber across the conveying means. A plurality of spray jets which may take the form of spray nozzles are positioned in the spray conduit and in fluid flow communication with respect to the interior of the spray conduit in such a manner as to receive cleaning solution therefrom to be directed through the spray outlet of the pre-washing housing onto both the conveying means and the eggs traveling thereon.

A pump means is further included in fluid flow communication with respect to the spray conduit to pump cleaning solution therethrough and on outward through the spray jets. A holding tank is included positioned below the pre-washing station for receiving cleaning solution after pre-washing of the conveying means and the eggs thereon. A return line is further included in fluid flow communication with respect to the holding tank and with respect to the pump means to supply cleaning solution to the pump means for pumping into the spray conduit.

An egg diverting means is included which is designed to prevent the grouping of eggs within one specific area of the conveying means prior to the eggs being specifically oriented in rows by the accumulator. This egg diverting means may include a plurality of rod means extending horizontally and laterally across the conveying means and immediately thereabove. Plate means are adjustably secured with respect to the rod means and extend downwardly therefrom immediately adjacent to the upper surface of the conveying means to urge the eggs being carried thereon to be approximately evenly distributed laterally to prevent bunching.

An accumulator means is included to divide the randomly positioned eggs into rows upon the conveying means. This accumulating means specifically comprises a plurality of channel members extending vertically with respect to the conveying means and immediately thereabove. The channel members are parallel with respect to one another to define egg receiving channels therebetween for ordering the eggs into rows. The channel members are laterally movable to facilitate movement of eggs into the egg receiving channels therebetween. A lateral moving means is secured with respect to the channel members for moving of the channel members laterally with respect to the conveying means and the eggs traveling thereon.

The accumulator of the present invention can divide the eggs into various patterns or rows. In one configuration as shown in FIG. 3, eggs are divided into twelve adjacent rows. This adjacent configuration could be six or eighteen or twenty-four. The number of rows can vary in accordance with the requirements of the user. Also there can be two adjacent rows of six normally being separated by a center null area as shown in FIG. 4.

A main washing station is positioned downstream from the accumulator and is adapted to receive eggs that are oriented in rows upon the conveying means for final washing thereof.

To facilitate the pre-washing station, a base panel may be included extending below the conveying means within the area of the pre-wash station to gather spent cleaning solution and channel same into the holding tank. Also, a filter means may be positioned between the base panel and the pre-washing station to filter the spent cleaning solution prior to passage into the holding tank to ready this solution to be recirculated through the return line and the pump means.

The conveying means in a preferred embodiment is configured as a two section unit. In particular, a first conveying section would extend through the pre-washing station and under the egg diverting means. A second conveying section would extend from a position immediately adjacent and downstream from the first conveying section through under the accumulator means to thereby receive eggs from the first conveying section for transporting thereof to the further downstream processing station such as the main washing station. To facilitate the movement of eggs between the first conveying section and the second conveying section, an interface plate may preferably be positioned extending approximately horizontally adjacent to the downstream end of the first conveying section and adjacent to the upstream end of the second conveying section and oriented at approximately the same level as the upper surfaces of the conveying section. In this manner, eggs are facilitated in their movement from the first conveying section to the second conveying section. Further preferably, the second conveying section will be moving at a surface speed somewhat greater than the first conveying section.

To facilitate inspection, the temperature of the cleaning solution sprayed within the pre-washing station can be elevated by use of a heating means. This will increase the internal temperature of the eggs traveling upon the conveyor and will allow visual inspection to more easily define defective eggs. With this configuration, an inspection station can be included to provide an initial inspection and removal of defective eggs usually performed in a manual manner.

The present invention may further include a photocell means positioned adjacent to and immediately upstream from the accumulator means to sense when the eggs start to climb upon one another. When this backup condition of the eggs upon the second conveying section is sensed, the photocell will operably halt movement of the first conveying section until the pile up condition of eggs has been alleviated. Once there is no longer a signal being generated by the photocell, the eggs will be sensed as no longer being in a pile up condition and movement of the first conveying section will be resumed. The present invention also includes a time delay after egg pile up before the first section is shut down to prevent repeated first section shut downs repsonsive to very minor egg pile up conditions. Similarly, a time delay will be included prior to reinitiating operation of the first conveying section responsive to minor unpiling conditions when the general overall conditions is still that of an egg pile up.

The moving means for controlling lateral movement of the channel means preferably takes the form of a bar means fixedly secured with respect to each of the channel means. A crank arm is pivotely secured with respect to the bar means and a drive means is attached with respect to the crank arm for controlling movement thereof. A crank is fixedly secured with respect to the drive shaft of the drive means and is pivotally secured with respect to the crank arm for reciprocally driving of the bar means in a cyclical fashion laterally to achieve the lateral repetitious movement of the channel means which is desired.

In a preferred configuration of the accumulator in the present invention, there is a first grouping of seven channel members defining six egg receiving recesses therebetween and a second grouping of seven channel members defining six egg receiving channels therebetween which are positioned laterally adjacent with respect to one another. In between the two innermost channel means is positioned a flexibly resilient arcuate member which facilitates guiding of the eggs into the two banks of six rows each.

To further control the output of eggs from the downstream end of the accumulator, a plurality of flat springs may be positioned immediately adjacent to the downstream end of each of the egg receiving channels to abut the eggs traveling therethrough to facilitate the control of movement thereof.

It is an object of the present invention to provide an apparatus for pre-washing and accumulating eggs wherein a pre-washing step is included to affectively soak the eggs with cleaning solution prior to initial processing steps performed thereon.

It is an object of the present invention to provide an apparatus for pre-washing and accumulating eggs wherein a spray conduit within the pre-washing station extends across the entire length of the conveying means to effectively prewash eggs randomly positioned upon a conveying belt as well as washing of the conveying belt itself.

It is an object of the present invention to provide an apparatus for pre-washing and accumulating eggs wherein an egg diverting means is included to eliminate initial bunching or grouping of eggs which are normally randomly positioned upon an egg conveying means.

It is an object of the present invention to provide an apparatus for pre-washing and accumulating eggs wherein an accumulator means is provided with regularly reciprocating laterally moving and vertically extending channel divider means.

It is an object of the present invention to provide an apparatus for pre-washing and accumulating eggs wherein an initial pre-candling operation is performed which is made possible by the heating of the eggs traveling through the pre-washing station by utilizing heated washing solution therein.

It is an object of the present invention to provide an apparatus for pre-washing and accumulating eggs wherein imperfect eggs are made significantly visible by heating of the temperature of the cleaning solution utilized in a prewashing step.

It is an object of the present invention to provide an apparatus for pre-washing and accumulating eggs wherein the eggs traveling upon the conveying means are in a wet condition when they are initially diverted and also accumulated into rows thereby facilitating movement and orientation.

It is an object of the present invention to provide an apparatus for pre-washing and accumulating eggs which allows for removal of eggs which are imperfect prior to washing such that these eggs can be utilized for other purposes rather than being merely waste material after the egg shell is completely destroyed during a washing operation performed upon a cracked egg.

It is an object of the present invention to provide an apparatus for pre-washing and accumulating eggs wherein a photocell means is included for shutting down an upstream conveyor responsive to a pile up condition of eggs immediately adjacent to the accumulator.

It is an object of the present invention to provide an apparatus for pre-washing and accumulating eggs wherein a centrally positioned arcuate flexible guide means is included for guiding of the eggs into two banks of six wide rows each.

It is an object of the present invention to provide an apparatus for pre-washing and accumulating eggs wherein a configuration is specifically easy to maintain with all parts being readily accessible.

It is an object of the present invention to provide an apparatus for pre-washing and accumulating eggs wherein the initial cost of set up is relatively inexpensive.

It is an object of the present invention to provide an apparatus for pre-washing and accumulating eggs wherein a number of processing steps are performed in combination with one another which work synergistically with respect to one another by all being performed immediately adjacent to and upstream with respect to the main washing means.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 1:
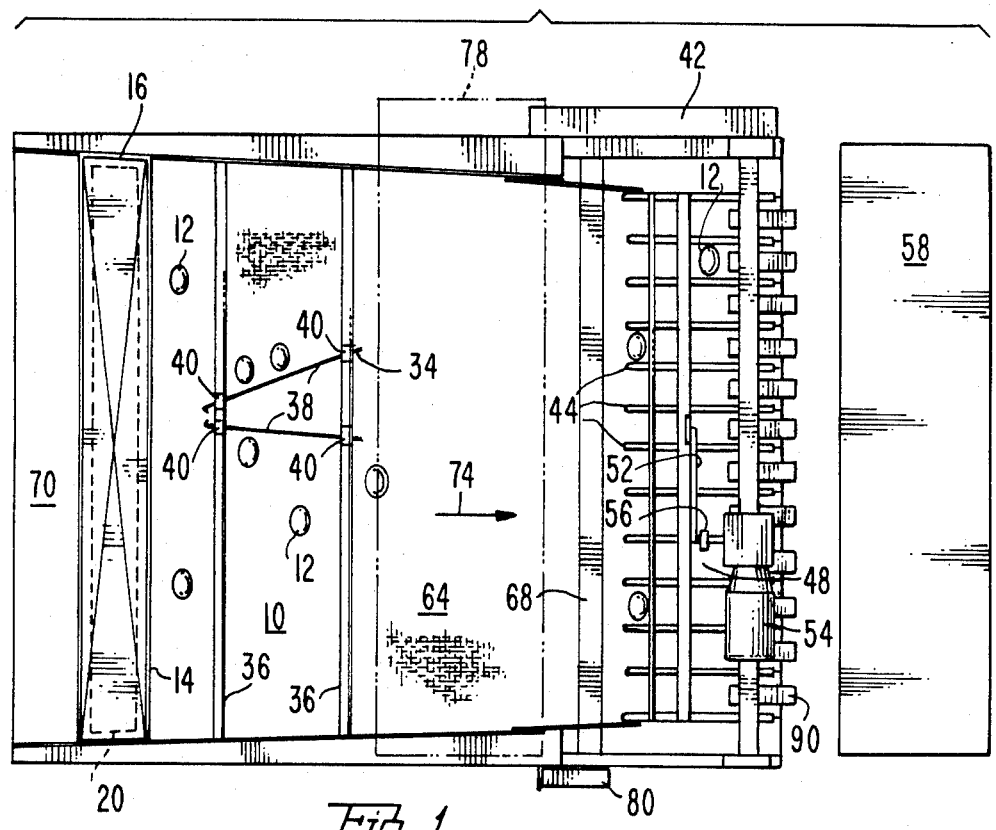
FIG. 1 is a top plan view of an embodiment of the apparatus for pre-washing and accumulating eggs of the present invention.

The present invention provides a conveying means 10 which is adapted to carry a plurality of eggs 12 which may be randomly positioned or oriented in rows. The eggs 12 being supplied on the upstream portion of the conveying means 10 is normally randomly positioned. The conveying means 10 supplies eggs 12 to a pre-washing station 14 which includes a pre-washing housing 16 defining a pre-washing chamber 18 therein.

A cleaning solution 22 is supplied through a spray conduit 24 located within the pre-washing housing 16. In the lower portion of the pre-washing housing 16 a spray outlet 20 is defined to allow the cleaning solution 22 to be sprayed through spray jets 26 or more particularly spray nozzles 27 which are positioned within spray conduit 24 to allow the cleaning solution 22 to be directed downwardly through spray outlet 20 onto the eggs and conveying means located therebelow.

Cleaning solution is supplied to the spray conduit 24 under pressure by a pump means 28. The pump means 28 receives cleaning solution from a return line 32 which is in fluid flow communication with respect to holding tank 30. In this manner, cleaning solution 22 is continuously circulated through the system of the pre-washing station. In particular, a base panel 60 may be included below the conveying means 10 in the immediate area of pre-washing station 14 to gather spent cleaning solution 22 and guide same into the holding tank 30. A filter means 62 may be positioned between the outlet of base panel 60 and the holding tank 30 to cleanse the cleaning solution such that it will again be in condition to be supplied through the pump means.

After the eggs have passed through the pre-washing station 14, an egg diverting means 34 may be included for minimizing the bunching of eggs which would normally be randomly positioned on the conveyor means. This egg diverting means 34 basically receives eggs which are bunched on the left-hand side of the conveyor and guides some of those eggs into the right-hand area, as well as operating vice-versa for groupings of eggs on the right-hand side of the conveyor. The egg diverting means 34 is in the form of a rod means 36 which includes a plurality of plate means 38 positioned parallel with or oblique with respect to the direction of movement of the conveyor means 10. Plate means 38 will not be positioned perpendicular with respect to the direction of movement of the conveying means 10. The plate means will include bracket means 40 for securing plate means 38 with respect to the rod means 36 in any of a variety of chosen configurations as the user desires.

An accumulator means 42 will be included having channel members 44 defining a plurality of egg receiving recesses 46 therebetween. Individual channel members will be generally parallel with respect to one another to define the egg receiving channels 46 to facilitate the guiding of eggs 12 into rows. A lateral moving means 48 will be included for reciprocating lateral movement of the channel means 44 with respect to conveying means 10 and thereby minimize egg backup or breakage. A bar means 60 preferably extends across the conveying means laterally and is secured with respect to each of the channel means 44 such that lateral movement of the bar means 50 will achieve lateral movement of each of the channel members 44 in a common manner. A crank arm 52 is preferably secured with respect to the bar means in a pivotal manner and is also pivotally secured with a crank 56 fixedly secured with respect to the output of a drive means 54. In this manner, rotation of movement of the drive means will cause reciprocal movement of the crank arm and a similar reciprocal movement laterally across the conveying means 10 by the bar means 50 and by channel members 44.

Further downstream from the accumulator means 42, a main washing station 58 will be positioned. The effectiveness of the performance of the main washing station 58 will be greatly enhanced by the pre-washing step performed within pre-washing housing 16. Since the eggs will be soaked with cleaning solution which will gradually soak into any dirt or grime on the outside of the egg and greatly enhance the main washing performed within station 58.

Figure 2:
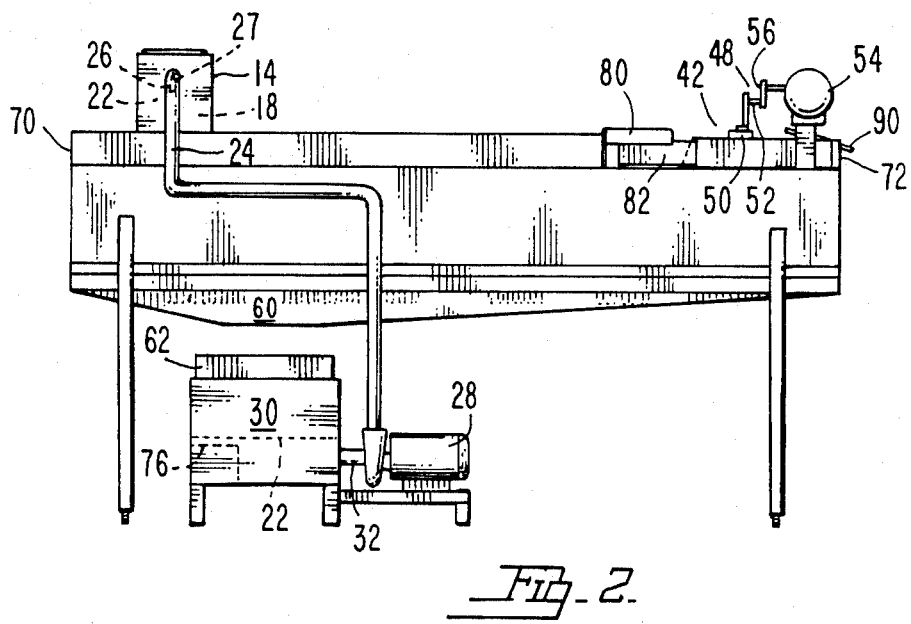
FIG. 2 is a side plan view of the embodiment shown in FIG. 1.
Figure 3:
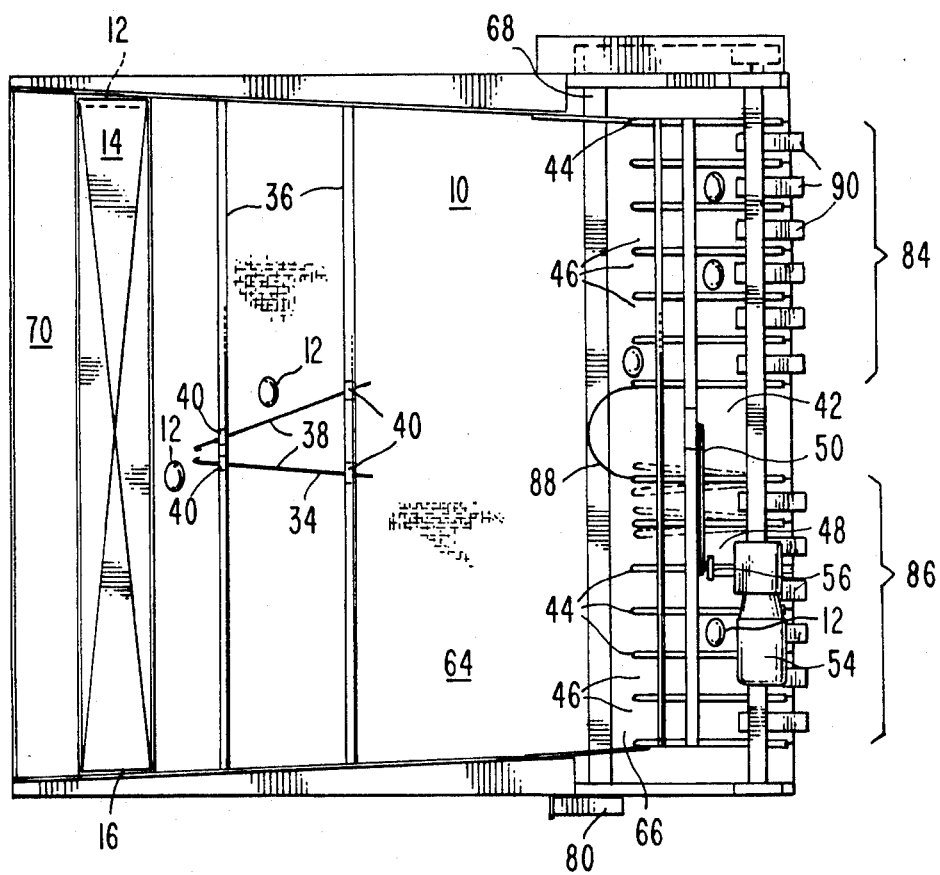
FIG. 3 is a top plan view of an alternative embodiment of the apparatus for pre-washing and accumulating eggs disclosed in the present invention.

Preferably the conveying means 10 will take the form of a first conveying section 64 and a second conveying section 66. First conveying section 64 should extend from the point of supply of randomly positioned eggs through under the pre-washing station 14 and under the egg diverting means 34 to a position immediately adjacent and upstream from accumulator means 42. Second conveying section 66 will extend from the downstream end of first conveying section 64 through the section of the accumulator means and onto the main washing station. Preferably the second conveying section 66 will be operating at a slightly greater surface speed than the first conveying section 64 to minimize the chance of egg back up immediately upstream from the accumulator section. Also, an interface plate 68 may preferably be positioned at the intersection between the first conveying section 64 and the second conveying section 66 to facilitate the movement of eggs from section 64 to section 66. This interface plate will be maintained at an approximate horizontally extending position equal to the vertical height of the surface of each of the two conveying sections. As shown in FIGS. 1 and 2, the upstream end 70 of the apparatus of the present invention is where the randomly positioned eggs are supplied and the downstream end 72 defines where the eggs 12 will be supplied in rows to the main washing station 58. The direction of movement is shown by movement direction arrow 74.

Heating means 76 may be further included within the pre-washing station to facilitate the pre-cleaning operation. Furthermore, the use of cleaning solution heated by the heating means 76 will greatly facilitate the usage of an inspection station 78. The inspection station preferably will be immediately upstream from the accumulator and will allow a person performing the visual inspection to manually remove imperfect eggs having cracks or being excessively dirty. The use of a heated cleaning solution greatly enhances this visual inspection and egg removal since flaws in the eggshell are much more easily to spot visually when the egg has been heated.

A photocell means 80 is positioned immediately upstream from accumulator 42 and includes a time delay means 82 therein. This photocell means 80 is adapted to sense a condition of backup of the eggs immediately upstream from the accumulator means 42 and after a time delay will terminate operation of the first conveying section 64. Once the egg pile up condition has been alleviated, another small time delay will occur and then the first conveying section 64 will again resume movement.

In another alternative configuration shown in FIG. 4, the channel members 44 will be divided into a first grouping 84 and a second grouping 86. Each of these two groupings will be made up of seven vertically extending channel members defining six channels therebetween. The two innermost channel means will be connected with respect to one another by a flexibly resilient arcuate guiding member which will move with the channel means back and forth laterally with respect to the conveyor means. This guiding member will facilitate the orientation of the eggs into two sections of rows thereof each being six eggs wide. This is a particular system adaptable for usage with various currently used on line systems.

To facilitate control of the eggs as they exit the downstream end of the accumulator means 42, an egg control flat springs 90 may be included as best shown in FIGS. 1 and 2. These egg control flat springs will provide for an orderly dispensing of eggs by the accumulator in oriented rows.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. An apparatus for pre-washing and accumulating eggs which comprises:
   (a) a conveying means for carrying a plurality of randomly positioned eggs thereon;
   (b) a pre-washing station including:
      (1) a pre-washing housing extending across said conveying means and defining a pre-washing chamber therein, said pre-washing housing also defining a spray outlet in the bottom area thereof for allowing the directing of cleaning solution onto both said conveying means and the eggs thereon positioned therebelow;
      (2) a spray conduit extending through said pre-washing chamber across said conveying means;
      (3) a plurality of spray jets positioned in said spray conduit and in fluid flow communication with respect to the interior of said spray conduit to receive cleaning solution therefrom to be directed through said spray outlet of said pre-washing housing onto both said conveying means and the eggs thereon traveling therebelow;
      (4) a pump means in fluid flow communication with respect to said spray conduit to pump cleaning solution therethrough and on outward through said spray jets;
      (5) a holding tank positioned below said pre-washing station for receiving cleaning solution after pre-washing of said conveying means and said eggs;
      (6) a return line in fluid flow communication with respect to said holding tank and with respect to said pump means to supply cleaning solution to said pump means for pumping into said spray conduit;
   (c) an egg diverting means for preventing grouping of eggs upon one specific area of said conveying means including:
      (1) a plurality of rod means extending horizontally and laterally across said conveying means and immediately thereabove;
      (2) at least one plate means adjustably secured with respect to at least one of said rod means and extending downwardly therefrom immediately adjacent to the upper surface of said conveying means to urge the eggs being carried thereon to be approximately evenly distributed laterally thereon to prevent grouping upon any specific area thereof;
   (d) an accumulator means to divide the randomly positioned eggs into rows upon said conveying means, said accumulator means comprising:
      (1) a plurality of channel members extending vertically with respect to said conveying means and immediately thereabove, said channel members being parallel with respect to one another to define eggs receiving channels therebetween for ordering the eggs into rows, said channel members being laterally movable to facilitate movement of eggs into said egg receiving channels therebetween;
      (2) a lateral moving means secured with respect to said channel members for moving said channel members laterally with respect to said conveying means and eggs traveling thereon;
   (e) a main washing station positioned downstream from said accumulator means adapted to receive eggs traveling upon said conveying means and oriented in rows for washing thereof.

2. The apparatus as defined in claim 1 further comprising a base panel extending below said conveying means within the area of said pre-wash station to gather spent cleaning solution and channel same into said holding tank.

3. The apparatus as defined in claim 1 further including a filter means positioned in said pre-washing station between said conveying means and said holding tank located therebelow to filter the spent cleaning solution prior to entering said holding tank.

4. The apparatus as defined in claim 1 wherein said conveying means comprises:
   (a) a first conveying section extending through said pre-washing station and under said egg diverting means;
   (b) a second conveying section extending from a position immediately adjacent and downstream from said first conveying section through under said accumulator means to receive eggs from said first conveying section for transporting thereof to further downstream processing stations;

(c) an interface plate extending approximately horizontally adjacent to the downstream end of said first conveying section and adjacent to the upstream end of said second conveying section and oriented at the approximate level of the upper surfaces of said first conveying section and said second conveying section to facilitate the downstream movement of eggs therebetween.

5. The apparatus as defined in claim 4 wherein said second conveying section is moving at a speed greater than the speed of movement of said first conveying section.

6. The apparatus as defined in claim 4 further comprising a photocell means adjacent to and upstream from said accumulator means to sense a height of egg level upon said conveyor means of more than approximately one egg and being responsive to selectively halt movement of said first conveying section upon sensing this pile up condition.

7. The apparatus as defined in claim 6 further comprising a time delay means to delay for a predetermined time period after said photocell means senses an egg pile up condition prior to halting movement of said first conveying section and wherein said time delay means is responsive to delay for a predetermined time period after said photocell again senses a normal egg flow condition prior to resuming movement of said first conveying section.

8. The apparatus as defined in claim 1 wherein said spray jets comprise nozzles positioned within said spray conduit for directing cleaning solution as desired downwardly therefrom.

9. The apparatus as defined in claim 1 further including a heating means to increase the temperature of cleaning solution sprayed within said pre-washing station.

10. The apparatus as defined in claim 1 further including a cleaning solution comprising a mixture of water and detergent for pre-soaking of eggs prior to movement thereof through said accumulator means.

11. The apparatus as defined in claim 1 wherein each of said plate means is secured to at least two of said rod means.

12. The apparatus as defined in claim 11 wherein said plate means is oriented parallel with respect to the direction of movement of said conveying means.

13. The apparatus as defined in claim 11 wherein said plate means is oriented obliquely with respect to the direction of movement of said conveying means.

14. The apparatus as defined in claim 1 further including an inspection station upstream with respect to said main washing station for removal of eggs prior to main washing.

15. The apparatus as defined in claim 14 wherein said inspection station is positioned upstream from said accumulator means and downstream from said pre-washing station.

16. The apparatus as defined in claim 14 wherein said inspection station is positioned downstream from said accumulator means and downstream from said pre-washing station.

17. The apparatus as defined in claim 1 wherein said spray jets are positioned completely laterally across said conveying means to apply cleaning solution to the entire width of said conveying means as well as to the eggs traveling thereon.

18. The apparatus as defined in claim 1 wherein said spray jets dispense sufficient cleaning solution to completely wet eggs traveling on said conveying means therebelow to facilitate movement thereof through said accumulator means.

19. The apparatus as defined in claim 1 wherein said lateral moving means further comprises:
  (a) a bar means fixedly secured with respect to each of said channel means;
  (b) a crank arm pivotally secured with respect to said bar means;
  (c) a drive means attached with respect to said crank arm for controlling movement thereof; and
  (d) a crank fixedly secured with respect to said drive means and pivotally secured with respect to said crank arm for reciprocally driving same and causing laterally cyclic movement of said bar means and also each of said channel means with respect to said conveying means therebelow.

20. The apparatus as defined in claim 1 further including a first grouping of seven channel members defining six egg receiving channels therebetween and a second grouping of seven channel members defining six egg receiving channels therebetween positioned laterally adjacent to said first grouping.

21. The apparatus as defined in claim 20 further including a flexibly resilient arcuate guiding member extending between the innermost channel member of said first grouping and the adjacent innermost channel member of said second grouping to facilitate guiding of eggs into the egg receiving channels defined by said first and second grouping.

22. The apparatus as defined in claim 1 further including egg control flat springs positioned immediately adjacent the downstream end of each of said egg receiving channels to abut eggs traveling therethrough to facilitate control of movement thereof.

23. An apparatus for pre-washing and accumulating eggs which comprises:
  (a) a conveying means for carrying a plurality of randomly positioned eggs thereon, said conveying means further comprising:
    (1) a first conveying section;
    (2) a second conveying section extending from a position immediately adjacent and downstream from said first conveying section to receive eggs from said first conveying section for transporting thereof to further downstream processing stations, said second conveying section adapted to move at a speed greater than the speed of movement of said first conveying section;
    (3) an interface plate extending approximately horizontally adjacent to the downstream end of said first conveying section and adjacent to the upstream end of said second conveying section and oriented at the approximate level of the upper surfaces of said first conveying section and said second conveying section to facilitate the downstream movement of eggs therebetween;
  (b) a pre-washing station including:
    (1) a pre-washing housing extending across said first conveying section and defining a pre-washing chamber therein, said pre-washing housing also defining a spray outlet in the bottom area thereof for allowing the directing of cleaning solution onto both said first conveying section and the eggs thereon positioned therebelow;
    (2) a spray conduit extending through said pre-washing chamber across said first conveying section;

(3) a plurality of spray jets positioned in said spray conduit and in fluid flow communication with respect to the interior of said spray conduit to receive cleaning solution therefrom to be directed through said spray outlet of said pre-washing housing onto both said first conveying section and the eggs thereon traveling therebelow, said spray jets including nozzles therein for further control of downward spraying, said spray jets being positioned completely laterally across said conveying means to apply cleaning solution to the entire width of said first conveying section as well as to the eggs traveling thereon;

(4) a pump means in fluid flow communication with respect to said spray conduit to pump cleaning solution therethrough and on outward through said spray jets;

(5) a holding tank positioned below said pre-washing station for receiving cleaning solution after pre-washing of said first conveying section and said eggs;

(6) a base panel extending below said first conveying section within the area of said pre-wash station to gather spent cleaning solution and channel same into said holding tank;

(7) a filter means positioned in said pre-washing station between said base panel and said holding tank located therebelow to filter the spent cleaning solution prior to entering said holding tank;

(8) a return line in fluid flow communication with respect to said holding tank and with respect to said pump means to supply cleaning solution to said pump means for pumping into said spray conduit;

(9) a heating means adjacent to said holding tank to selectively warm the cleaning solution prior to spraying upon said first conveying section and the eggs traveling thereon;

(c) an egg diverting means for preventing grouping of eggs upon one specific area of said conveying means including:

(1) a plurality of rod means extending horizontally and laterally across said first conveying section and immediately thereabove;

(2) at least one plate means adjustably secured with respect to at least two of said rod means and extending downwardly therefrom immediately adjacent to the upper surface of said first conveying section to urge the eggs being carried thereon to be approximately evenly distributed laterally thereon to prevent grouping upon any specific area thereof;

(d) an accumulator means being positioned immediately downstream from said interface plate above said second conveying section, said accumulator means adapted to divide the randomly positioned eggs into rows upon said second conveying section, said accumulator means comprising:

(1) a plurality of channel members extending vertically with respect to said second conveying section and immediately thereabove, said channel members being parallel with respect to one another to define eggs receiving channels therebetween for ordering the eggs into rows, said channel members being laterally movable to facilitate movement of eggs into said egg receiving channels therebetween;

(2) a lateral moving means secured with respect to said channel members for moving said channel members laterally with respect to said second conveying section and eggs traveling thereon, said lateral moving means further comprising:

(a) a bar means fixedly secured with respect to each of said channel means;

(b) a crank arm pivotally secured with respect to said bar means;

(c) a drive means attached with respect to said crank arm for controlling movement thereof; and (d) a crank fixedly secured with respect to said drive means and pivotally secured with respect to said crank arm for reciprocally driving same and causing laterally cyclical movement of said bar means and also each of said channel means with respect to said conveying means therebelow;

(e) a photocell means adjacent to and upstream from said accumulator means to sense a height of egg level upon said second conveying section of more than approximately one egg and being responsive to selectively halt movement of said first conveying section upon sensing this condition;

(f) a time delay means to delay for a predetermined time period after said photocell means senses an egg pile up condition prior to halting movement of said first conveying section and wherein said time delay means is responsive to delay for a predetermined time period after said photocell again senses a normal egg flow condition prior to resuming movement of said first conveying section;

(g) a main washing station positioned downstream from said accumulator means adapted to receive eggs traveling upon said second conveying section and oriented in rows for washing thereof;

(h) an inspection station positioned upstream with respect to said main washing station for removal by visual inspection of damaged eggs prior to main washing;

(i) egg control flat springs positioned immediately adjacent the downstream end of each of said egg receiving channels to abut eggs traveling therethrough to facilitate control of movement thereof.

24. The apparatus as defined in claim 23 further including a first grouping of seven channel members defining six eggs receiving channels therebetween and a second grouping of seven channel members defining six egg receiving channels therebetween positioned laterally adjacent to said first grouping.

25. The apparatus as defined in claim 24 further including a flexibly resilient arcuate guiding member extending between the innermost channel member of said first grouping and the innermost channel member of said second grouping to facilitate guiding of eggs into the egg receiving channels defined by said first and second grouping.

26. The apparatus as defined in claim 23 wherein said spray jets dispense sufficient cleaning solution to completely wet eggs traveling on said conveying means therebelow to facilitate movement thereof through said accumulator means.

* * * * *